T. P. HIORNS.
Depth-Gages for Surfaces.
No. 146,531. Patented Jan. 20, 1874.
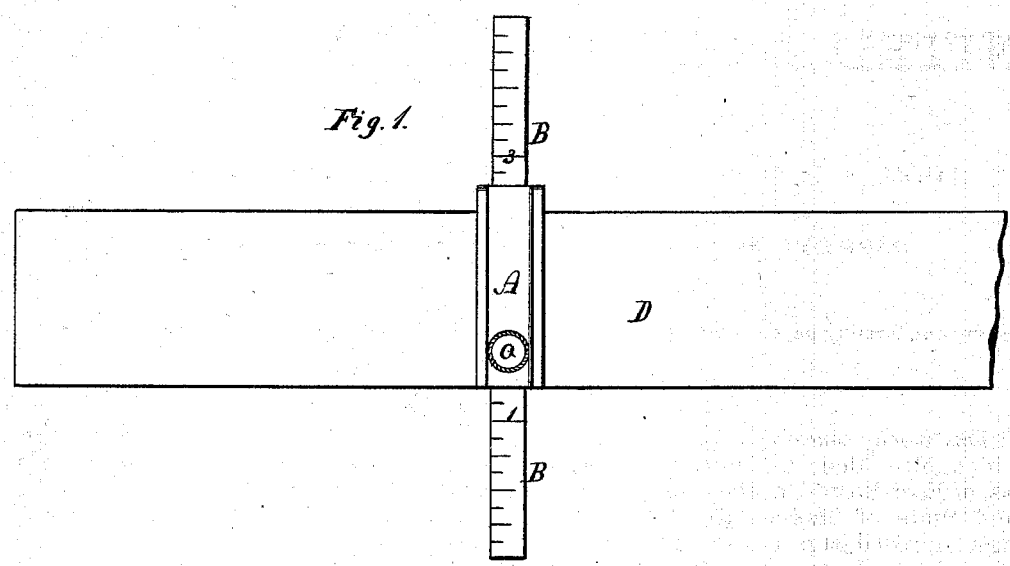
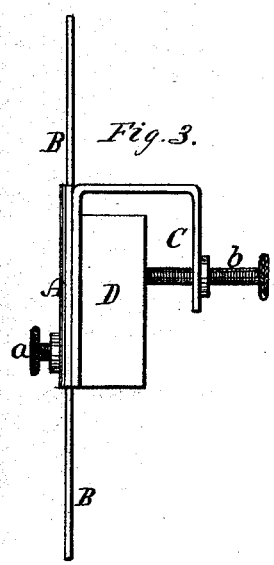
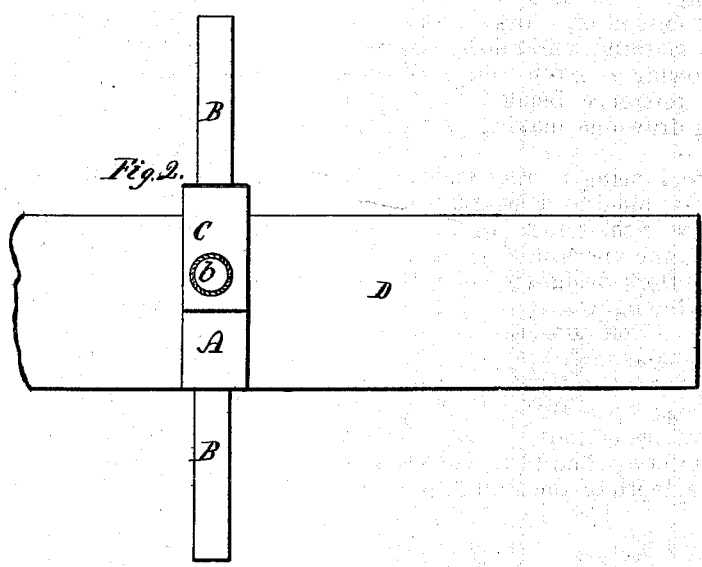
Witnesses,
E. M. Gallaher
R. D. Smith
Inventor,
Thos. P. Hiorns
By his Atty.
J. S. Brown

UNITED STATES PATENT OFFICE.

THOMAS P. HIORNS, OF EAST BOSTON, MASSACHUSETTS.

IMPROVEMENT IN DEPTH-GAGES FOR SURFACES.

Specification forming part of Letters Patent No. 146,531, dated January 20, 1874; application filed June 25, 1873.

*To all whom it may concern:*

Be it known that I, THOMAS PALMER HIORNS, of East Boston, in the county of Suffolk and State of Massachusetts, have invented an improved gage for gaging the depths of sinkings in the faces or sides of articles cut from, or formed of, marble, stone, wood, iron, or other material; and I do hereby declare that the following is a full and exact description thereof, reference being had to the accompanying drawings making part of this specification—

Figure 1 being a front view of the instrument as applied to a straight-edge; Fig. 2, a back view of the same; Fig. 3, a view at right angles to the views in Figs. 1 and 2.

Like letters designate corresponding parts in all of the figures.

My invention consists in a small gage constructed so as to be applied to a straight-edge or rule, for determining the depth of cuttings or sinkings in the surfaces of marble slabs, or other articles of marble, stone, wood, iron, and other materials, and being adjustable, to graduate the depth of the sinkings, as required.

The gage is composed substantially of a socket, A, in which slides a graduated scale, B, to be adjusted and held in position by a set-screw, $a$, and from the socket a clamp or clip, C, extends, formed substantially as shown, and provided with a set-screw, $b$, for securing the gage to a rule or straight-edge, D, in such a position that the lower or gage end of the socket shall be flush or even with the lower edge of the rule or straight-edge.

The gage may be made of brass, steel, or other suitable material, and of the size shown, or of any other size that may be convenient.

What I claim as my invention, and desire to secure by Letters Patent, is—

The gage for gaging the sinkings in the surfaces of marble, stone, wood, iron, and other materials, composed of the socket A, adjustable graduated scale B, and clamp C, substantially as herein specified.

THOMAS P. HIORNS.

Witnesses:
 ELISHA BASSETT,
 C. F. LOFTUS.